United States Patent
Komatsu et al.

(10) Patent No.: US 9,811,147 B2
(45) Date of Patent: Nov. 7, 2017

(54) DISPLAY DEVICE EQUIPPED WITH INPUT SENSOR AND CONTROL METHOD OF DISPLAY DEVICE

(71) Applicant: Japan Display Inc., Tokyo (JP)

(72) Inventors: Hidetoshi Komatsu, Tokyo (JP); Jin Ota, Tokyo (JP); Hiroshi Mizuhashi, Tokyo (JP); Koji Noguchi, Tokyo (JP)

(73) Assignee: Japan Display Inc., Tokyo (JP)

( * ) Notice: Subject to any disclaimer, the term of this patent is extended or adjusted under 35 U.S.C. 154(b) by 295 days.

(21) Appl. No.: 14/680,515

(22) Filed: Apr. 7, 2015

(65) Prior Publication Data

US 2015/0286268 A1    Oct. 8, 2015

(30) Foreign Application Priority Data

Apr. 7, 2014 (JP) ................. 2014-078783

(51) Int. Cl.
G06F 1/32 (2006.01)
G06F 3/044 (2006.01)
G09G 5/00 (2006.01)
G06F 3/041 (2006.01)

(52) U.S. Cl.
CPC .......... *G06F 1/3265* (2013.01); *G06F 1/3262* (2013.01); *G06F 1/3287* (2013.01); *G06F 1/3296* (2013.01); *G06F 3/044* (2013.01); *G06F 3/0412* (2013.01); *G06F 3/0416* (2013.01); *G09G 5/003* (2013.01); *G06F 2203/04101* (2013.01); *G09G 2330/023* (2013.01); *G09G 2354/00* (2013.01); *Y02B 60/1242* (2013.01); *Y02B 60/1282* (2013.01); *Y02B 60/1285* (2013.01); *Y02B 60/32* (2013.01)

(58) Field of Classification Search
CPC .... G06F 1/3265; G06F 1/3287; G06F 1/3296; G06F 3/0412; G06F 3/0416; G06F 3/044; G06F 2203/04101; G06F 1/3262; G09G 5/003; G09G 2330/023; G09G 2354/00; Y02B 60/1242; Y02B 60/1282; Y02B 60/1285; Y02B 60/32
See application file for complete search history.

(56) References Cited

U.S. PATENT DOCUMENTS

| 9,128,557 B2 * | 9/2015 | Fujioka ............... G02F 1/13338 |
| 2008/0273126 A1 * | 11/2008 | Chang .................... H04N 9/641 |
| | | 348/836 |
| 2012/0050217 A1 | 3/2012 | Noguchi et al. |
| 2012/0188200 A1 | 7/2012 | Roziere |
| 2012/0241768 A1 * | 9/2012 | Murai ................... G06F 3/0412 |
| | | 257/84 |
| 2013/0265276 A1 * | 10/2013 | Obeidat ................ G06F 3/044 |
| | | 345/174 |

FOREIGN PATENT DOCUMENTS

| JP | 2012-048295 | 3/2012 |
| JP | 2013-501287 | 1/2013 |

* cited by examiner

*Primary Examiner* — Julie Anne Watko
(74) *Attorney, Agent, or Firm* — K&L Gates LLP

(57) ABSTRACT

According to one embodiment, the display device includes a display panel and touchsensor, the touchsensor outputs a detected signal from detection electrode. An energy saving control section sets a first period in which the detected signal is to be captured, and a second period which is a period except the first period, and controls, in the first period, at least power supply voltage of an image processing section, a panel control section and the display panel to an off-state or to a low voltage.

13 Claims, 14 Drawing Sheets

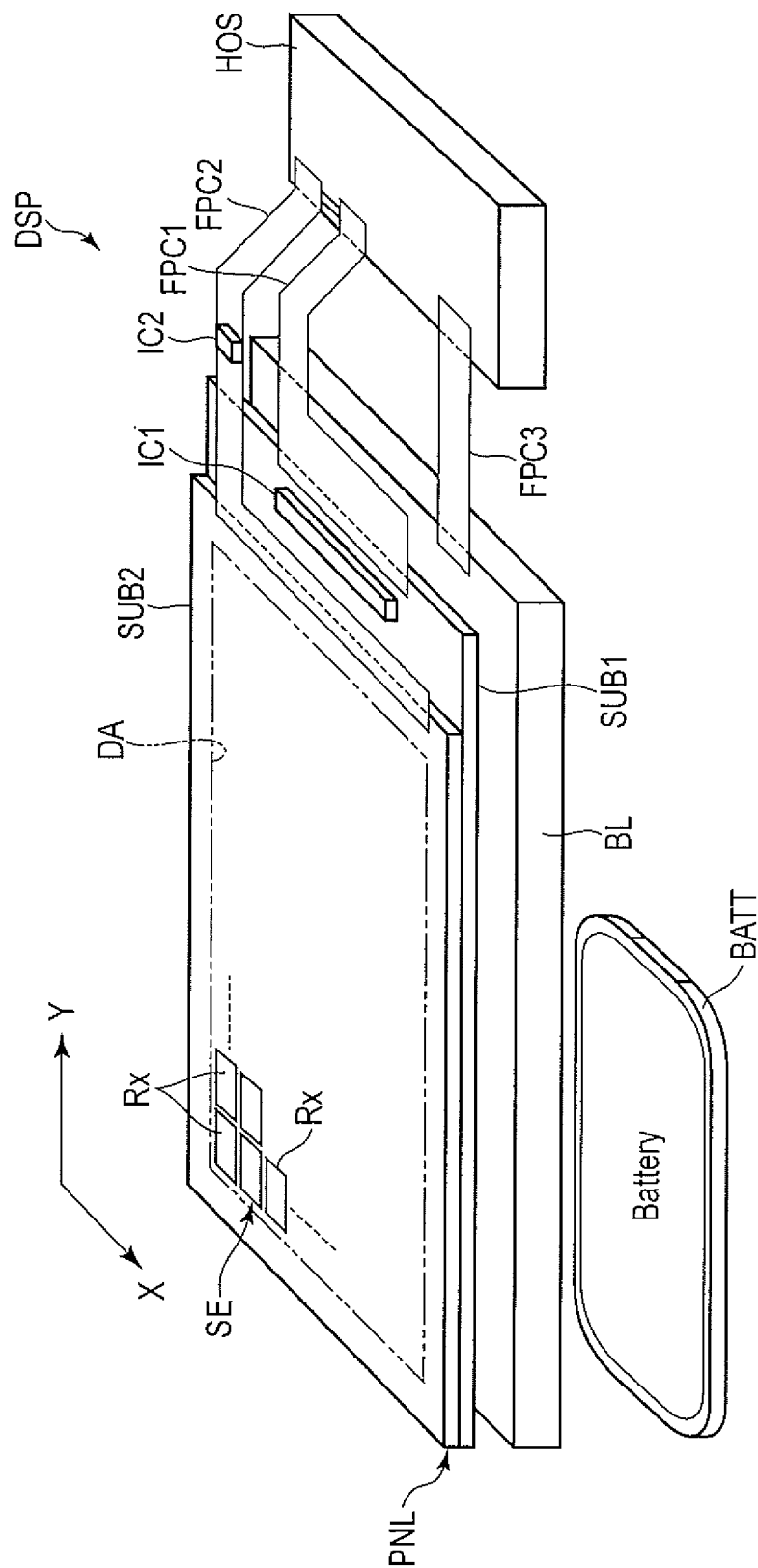
F I G. 1

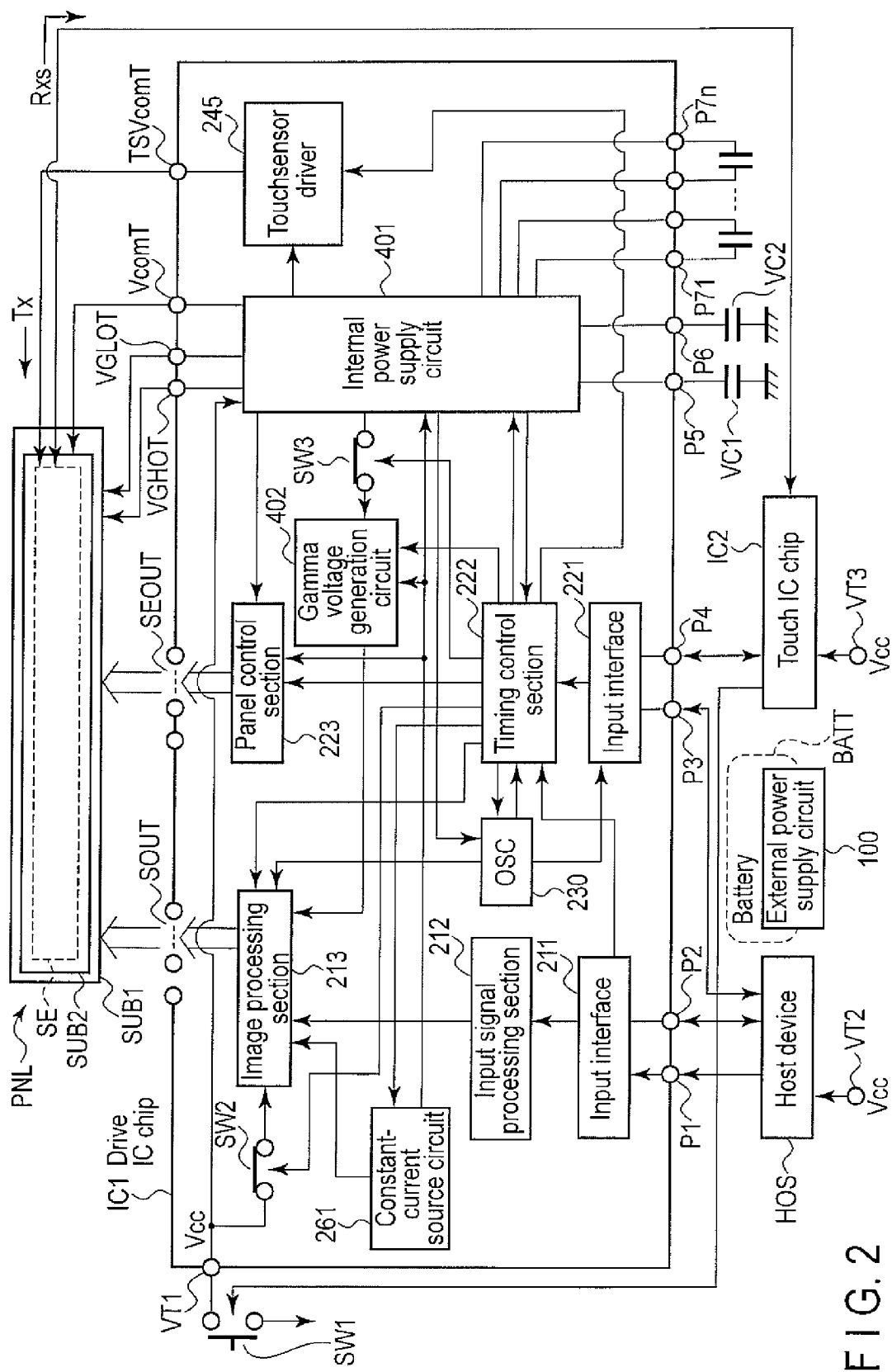
F I G. 2

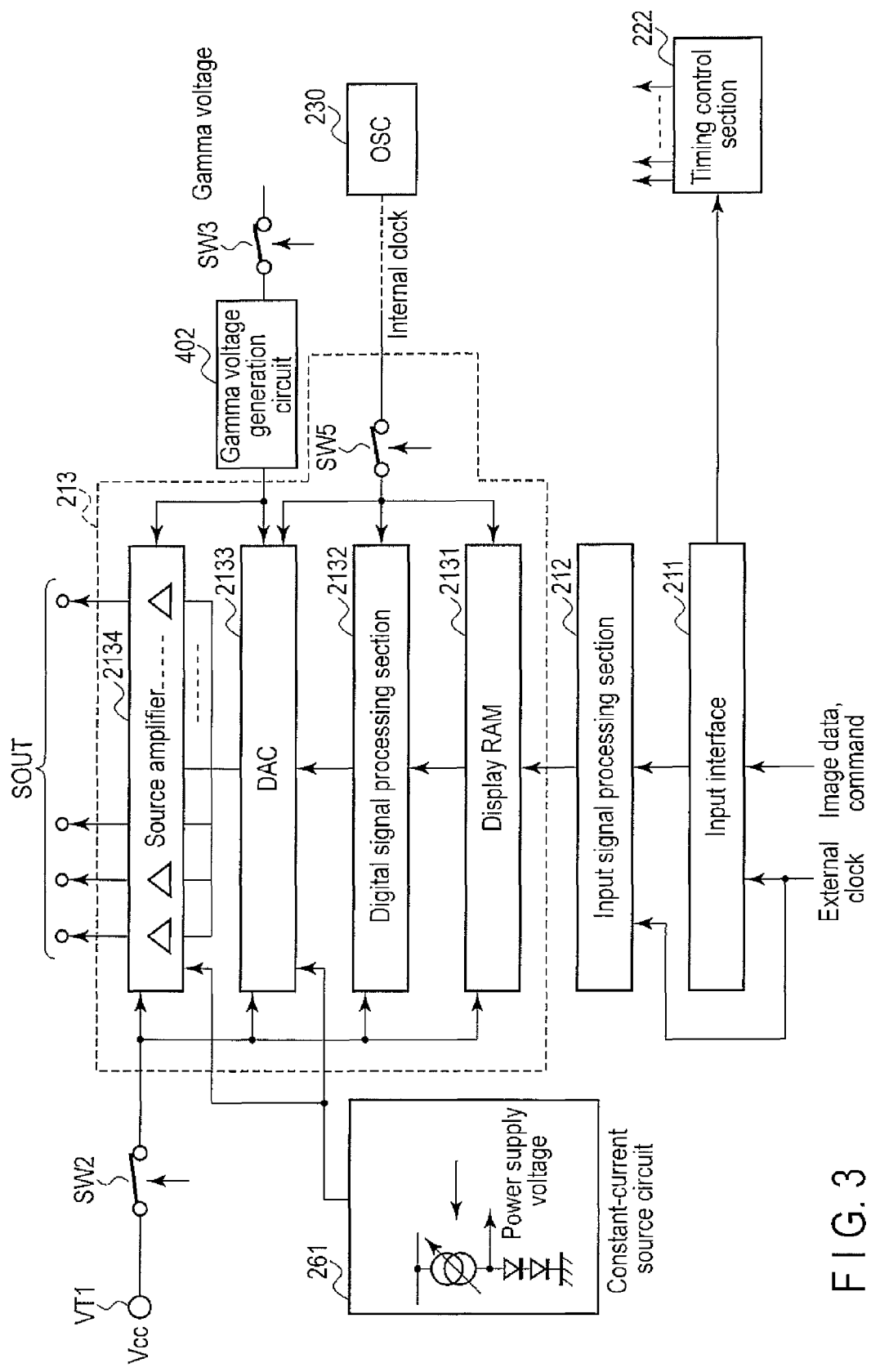
F I G. 3

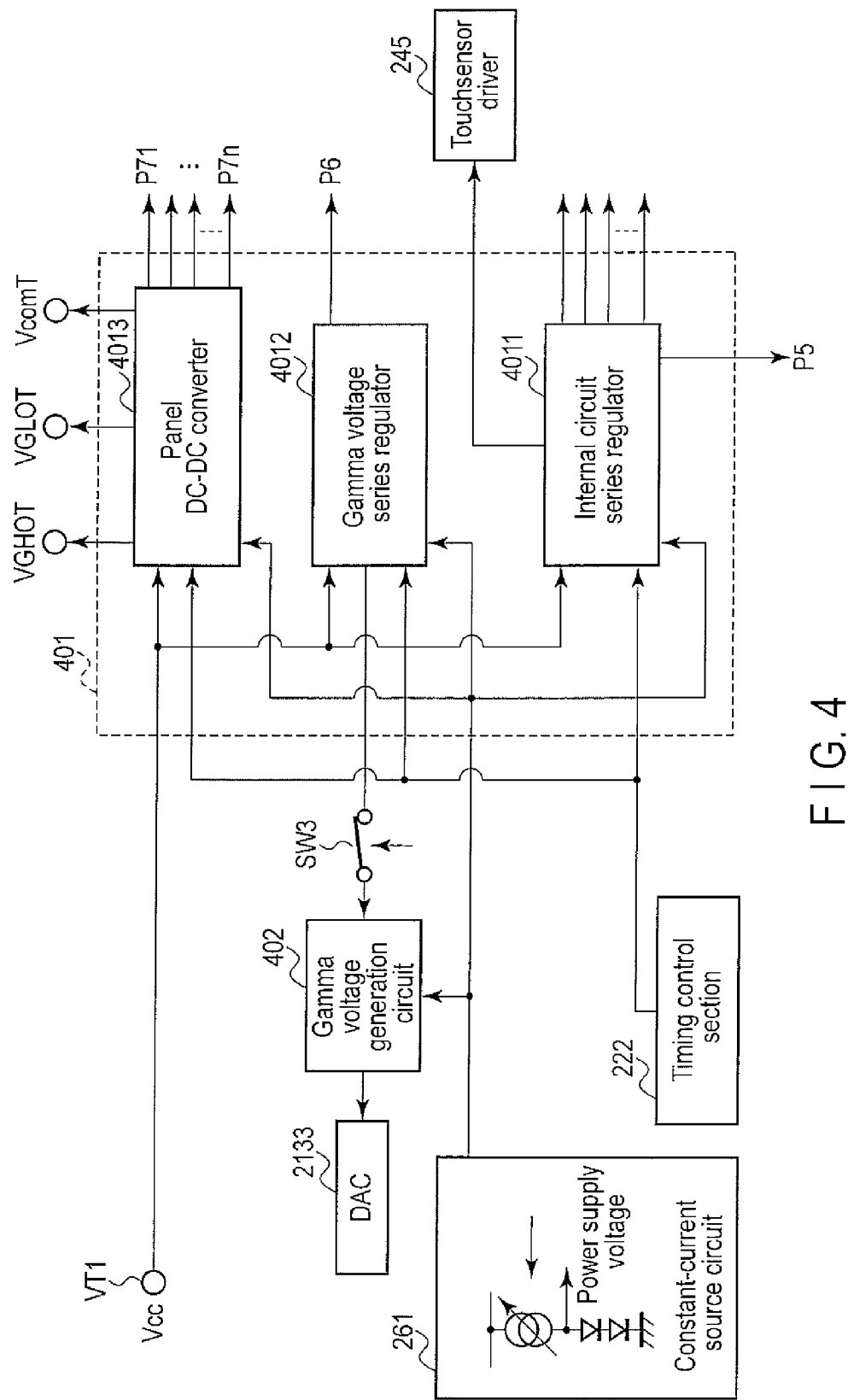
F I G. 4

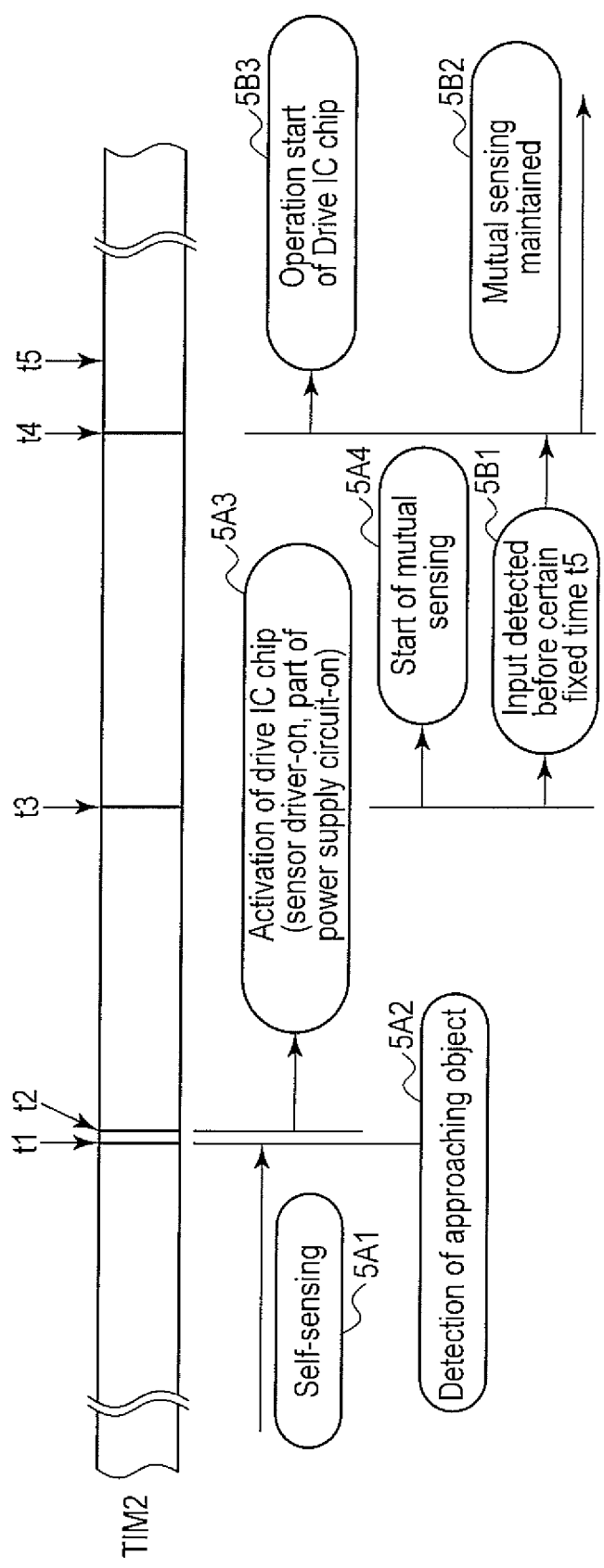
F I G. 5B

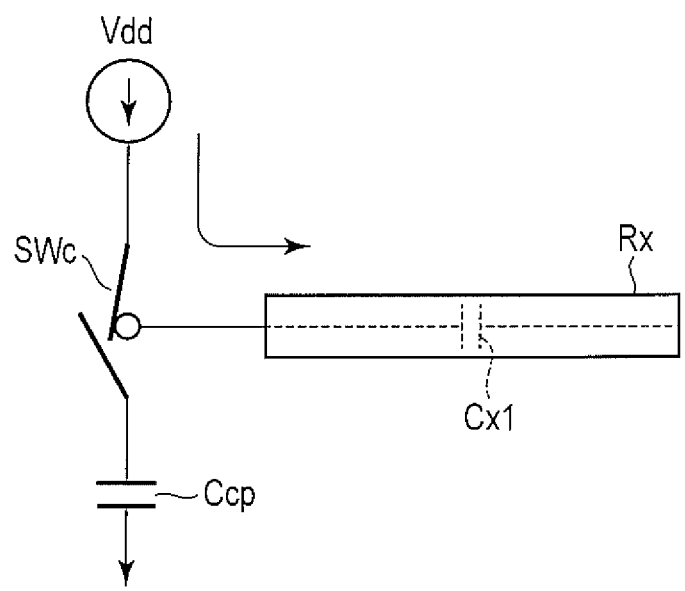
F I G. 6A
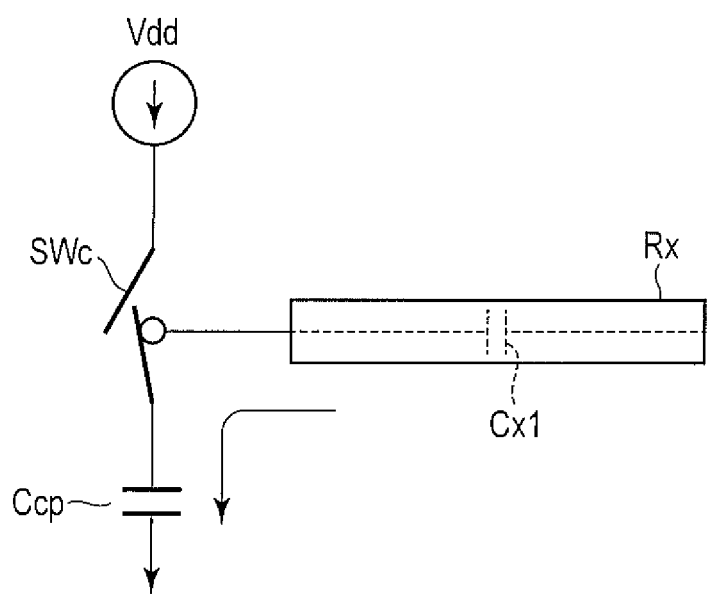
F I G. 6B

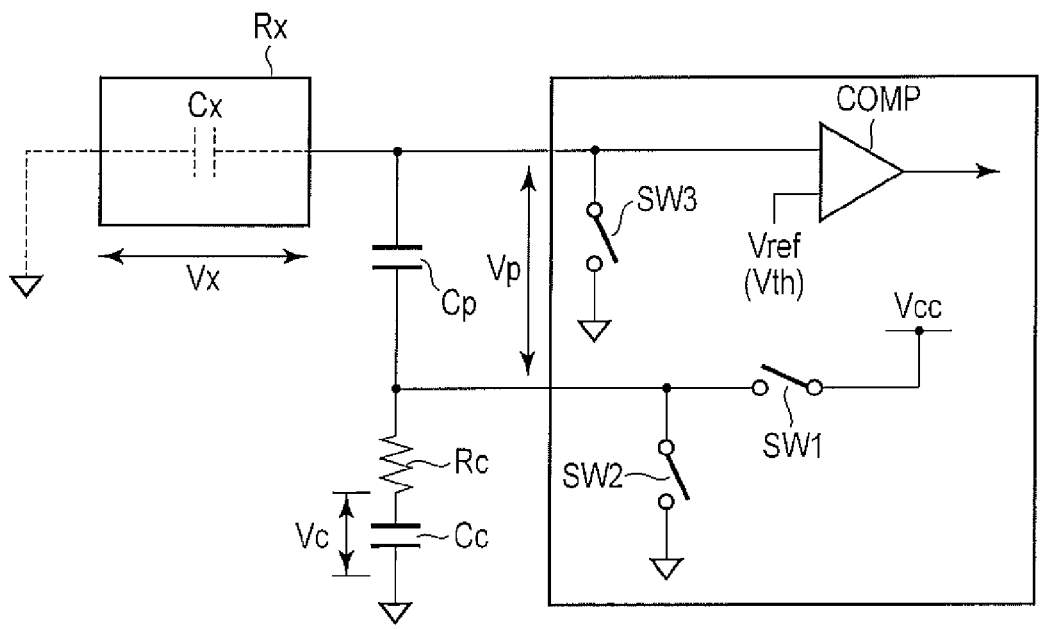
F I G. 8A
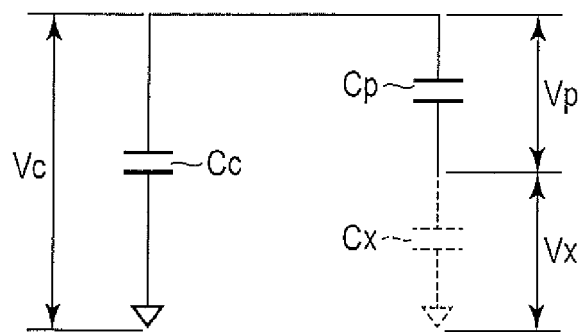
F I G. 8B

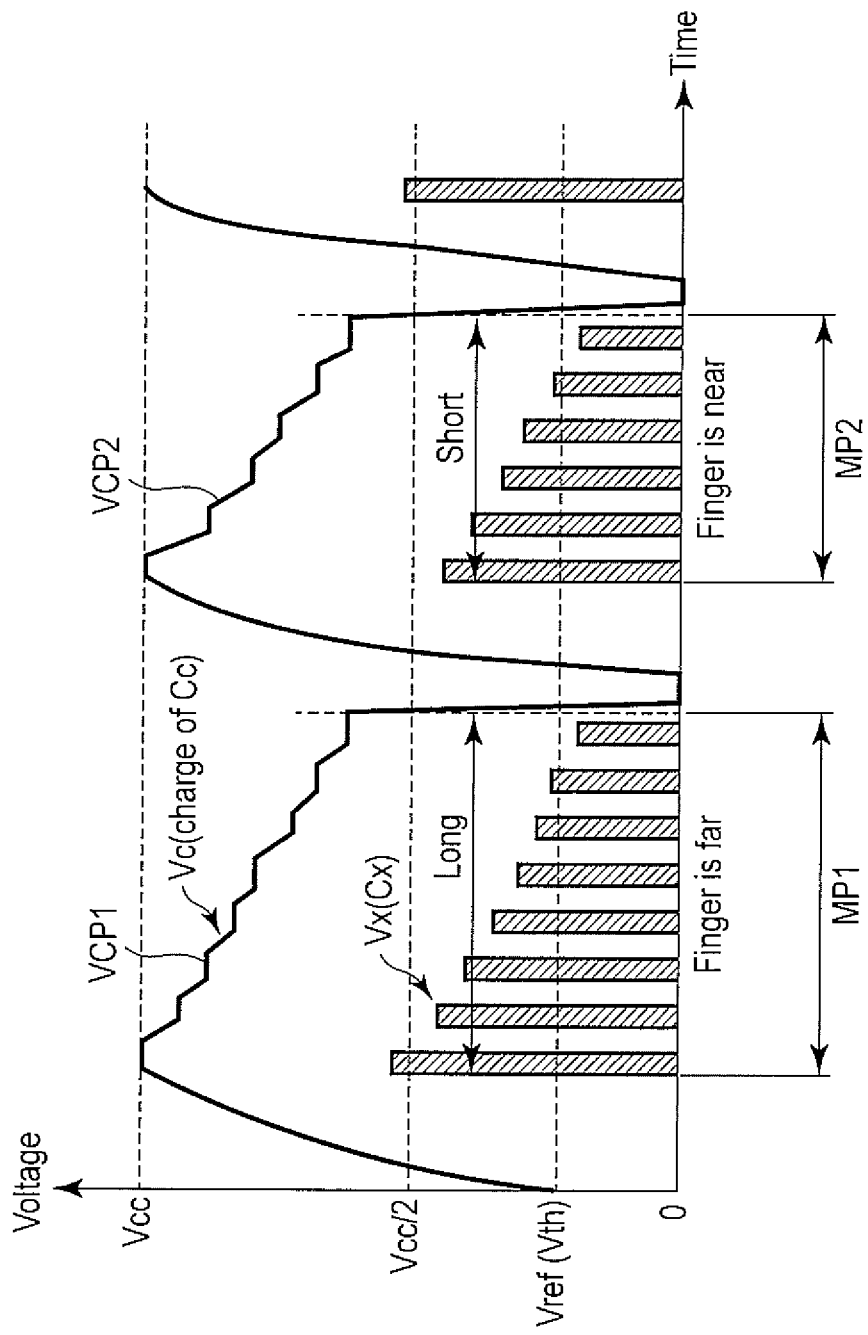
F I G. 9

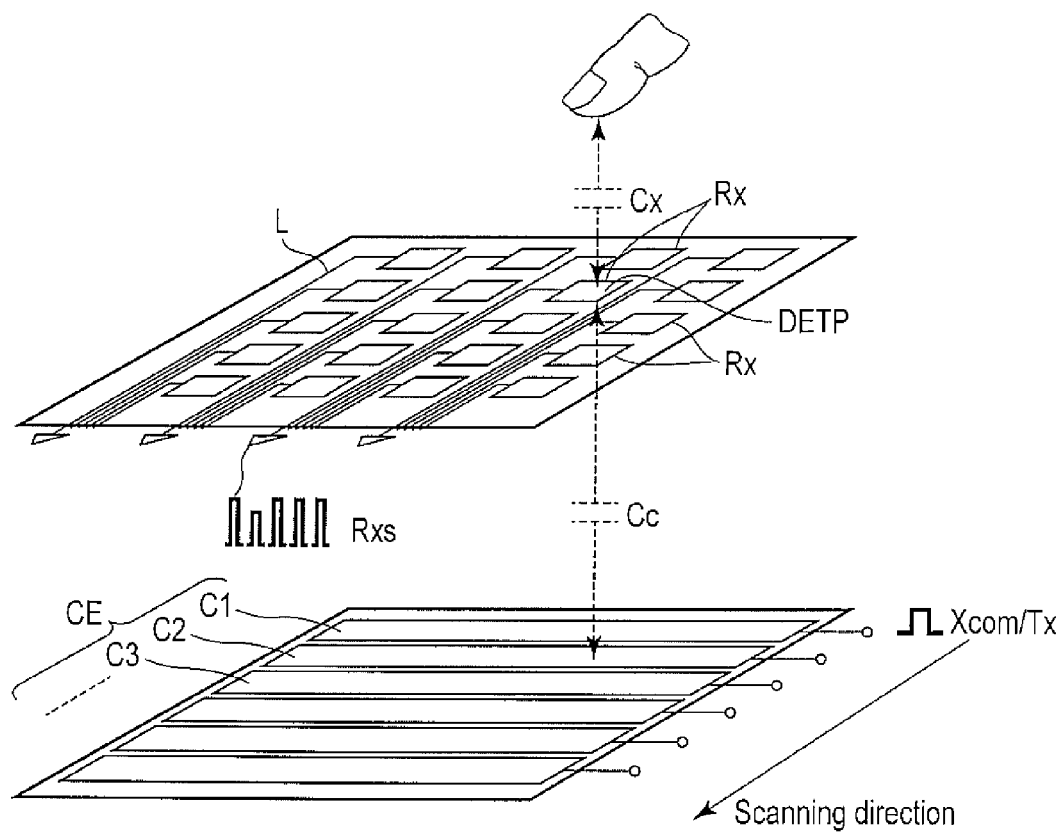
F I G. 10
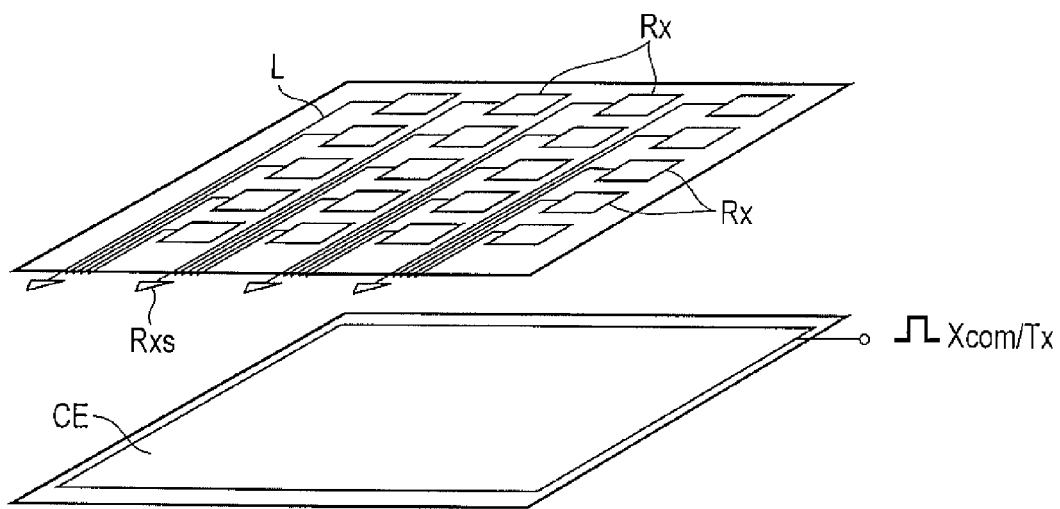
F I G. 11

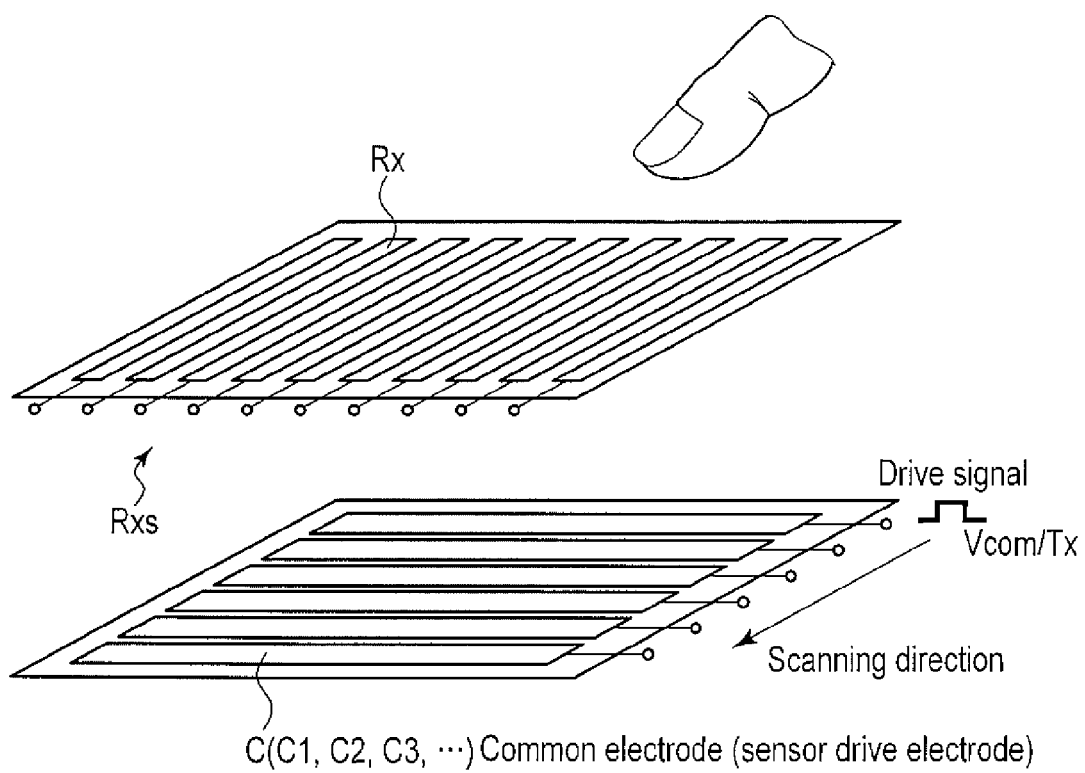
F I G. 12

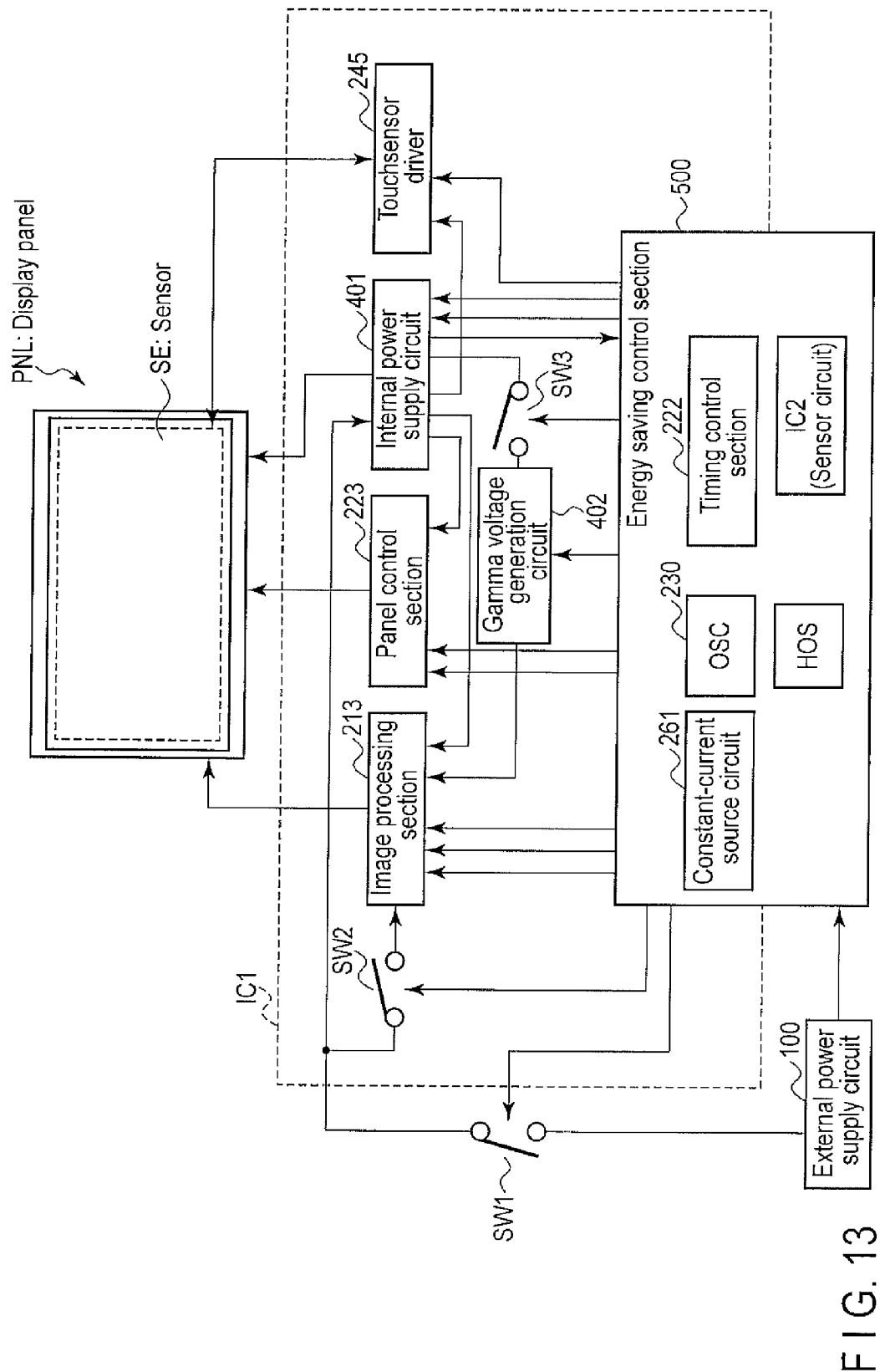
F I G. 13

DISPLAY DEVICE EQUIPPED WITH INPUT SENSOR AND CONTROL METHOD OF DISPLAY DEVICE

CROSS REFERENCES TO RELATED APPLICATIONS

The present application claims priority to Japanese Priority Patent Application JP 2014-078783 filed in the Japan Patent Office on Apr. 7, 2014, the entire content of which is hereby incorporated by reference.

BACKGROUND

Portable devices (smartphones, tablet computers, personal digital assistants, and the like), which have lately become widespread, generally use a secondary battery as an energy source.

Such portable devices are each equipped with an input sensor configured to detect a change in electrostatic capacitance. When a conductor, for example, the user's finger or the like, comes close to the surface of a display panel of the portable device, the input sensor detects position information about the finger as operation input.

As the input sensor, there are an in-cell type sensor incorporated in a display panel and on-cell type sensor arranged on a surface of a display panel.

Besides, the portable device has a wakeup function. If the input sensor detects a conductor such as a finger of the user, the wakeup function brings, when the device is in the sleep state, the internal power supply circuit to the regular operating state, and shifts the display panel to the display state.

However, when the input sensor detects a conductor such as the finger of the user, the user does not always intend to use the portable device. There are many instances where the user only touches the portable device. For example, there is a case where the user simply stows the portable device in a bag, a case where the user simply switches the portable device from one hand to the other, a case where the user simply touches the portable device in the pocket, and the like. Besides, there is also a case where the portable device is frequently used by the user actually.

As described above, there are many instances where the energy of the secondary battery of the portable device is consumed. For this reason, under current circumstances, portable devices require charging of the secondary battery almost every day, and users find it troublesome.

SUMMARY

Embodiments described herein relate generally to a display device equipped with an input sensor, and a control method thereof.

Additional features and advantages are described herein, and will be apparent from the following Detailed Description and the figures.

BRIEF DESCRIPTION OF THE FIGURES

FIG. 1 is a perspective view schematically showing the configuration of a display device according to an embodiment.

FIG. 2 is a view showing the schematic configuration of the inside of the chip of a drive integrated circuit (IC) chip shown in FIG. 1.

FIG. 3 is a view showing the image processing section and peripheral circuits thereof in FIG. 2 in an extracting manner.

FIG. 4 is a view showing the power supply circuit and peripheral circuits thereof in FIG. 2 in an extracting manner.

FIG. 5B is a timing chart showing an example of another operation to be carried out when the display device shifts from the sleep state to the wakeup state.

FIG. 6A is a view for explaining a self-detection system applicable to the display device, and is a view showing a state where a detection electrode is charged when electrostatic capacitance coupling does not occur between the detection electrode and the finger.

FIG. 6B is a view subsequent to FIG. 6A, for explaining the self-detection system, and is a view showing a state where discharge from the sensing electrode is carried out.

FIG. 8A is circuit diagram showing an example of the basic configuration for realizing the self-detection system.

FIG. 8B is an equivalent circuit diagram showing the capacitance shown in FIG. 8A, and is a view showing a state where the charge of capacitance Cc has moved to capacitance Cp and Cx.

FIG. 9 is a view showing a change in voltage Vx of capacitance Cx by a column graph and a change in voltage Vc of capacitance Cc by a line graph, voltage Vx of capacitance Cx and voltage Vc of capacitance Cc being shown in FIG. 8A and FIG. 8B.

FIG. 10 is a view for explaining a configuration example of a mutual detection system applicable to the display device.

FIG. 11 is a view for explaining another configuration example of the mutual detection system applicable to the display device.

FIG. 12 is a view for explaining still another configuration example of the mutual detection system applicable to the display device.

FIG. 13 is a view for explaining an example of a characteristic concept included in the display device.

DETAILED DESCRIPTION

Figure 5A:
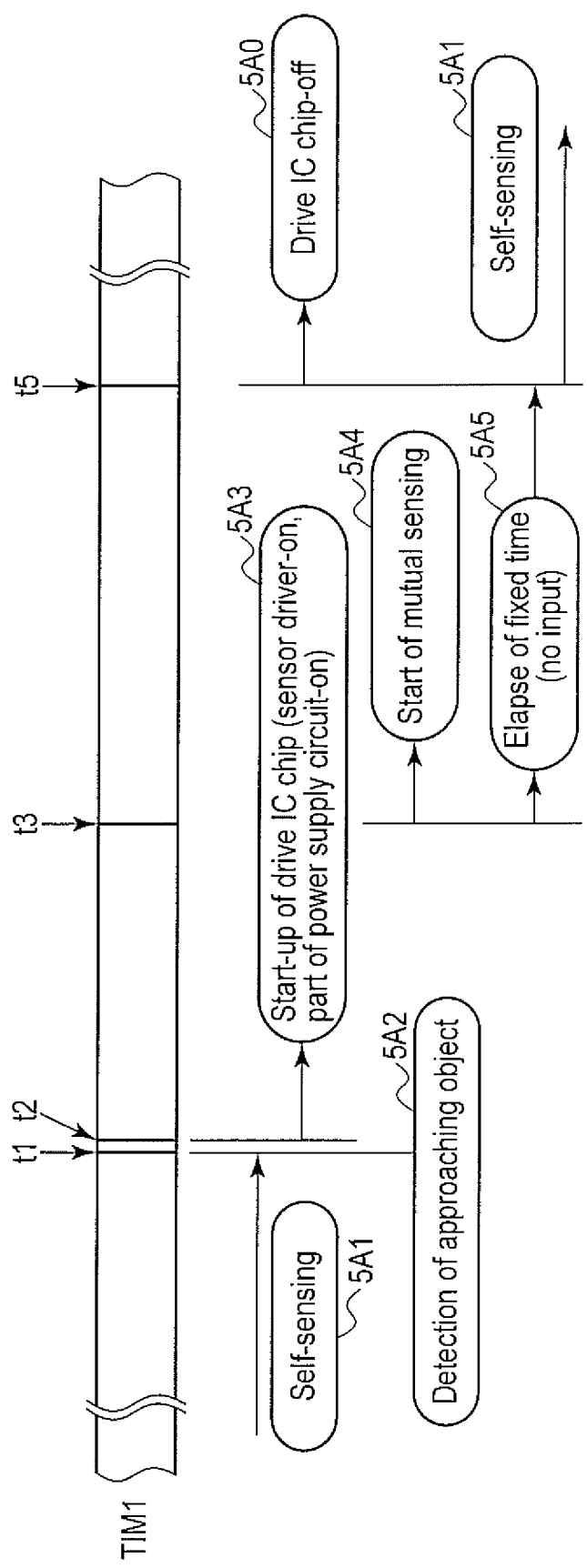
FIG. 5A is a timing chart showing an example of an operation to be carried out when the display device shifts from a sleep state to a wakeup state.

Various embodiments will be described hereinafter with reference to the accompanying drawings.

First, the basic concept of this embodiment will be described below. This embodiment aims to provide a display device equipped with an input sensor and capable of reducing energy consumption and reducing the number of times of charging, and a control method of the display device.

The display device equipped with an input sensor according to an embodiment basically includes a display panel and input sensor. The display panel includes display element arrangement configured to display an image. The input sensor is provided in the display panel, includes a drive electrode and detection electrode, and outputs a detection signal from the detection electrode. Besides, the display device further includes an image processing section, panel control section, internal power supply circuit, and energy saving control section.

The image processing section outputs an image signal to be written to the display panel. The panel control section outputs a panel drive signal used to drive the display panel. The sensor driver outputs a sensor drive signal used to drive the input sensor. The internal power supply circuit outputs a power supply voltage to be supplied to each of the image processing section, panel control section, display panel, and sensor driver.

Here, the energy saving control section can set a first period in which the detection signal is to be captured from the detection electrode of the sensor and second period excluding the first period, and control, in the first period, at least the power supply voltage of the image processing section and panel control section, and the power supply voltage to be supplied from the internal power supply circuit to the display panel to an off-state or to a low voltage.

According to this embodiment, it is possible to reduce the energy consumption of the display device equipped with an input sensor, and make the capacity of the battery serving as a source of electrical energy durable. Besides, according to this embodiment, it is possible to reduce the number of times of charging of the battery.

Hereinafter, the display device equipped with an input sensor according to the embodiment, and a driving method of the display device will be described in detail, and more specifically with reference to the drawings. In this embodiment, descriptions will be given assuming that the display device is a liquid crystal display device.

FIG. 1 is a perspective view showing the schematic configuration of a display device equipped with an input sensor according to an embodiment. In FIG. 1, the liquid crystal display device DSP is provided with, for example, an active matrix display panel PNL, drive IC chip IC1 (may be called a first IC chip or a drive circuit) configured to drive the display panel PNL, capacitance change detection sensor SE, touch IC chip IC2 (may be called a second IC chip or sensor circuit) configured to drive the sensor SE, backlight unit BL configured to illuminate the display panel PNL, host device (may be called a system control block) HOS, flexible wiring substrate FPC1, FPC2, FPC3, and the like.

The drive IC chip IC1, and the touch IC chip IC2 described above may be an identical chip.

In the example of FIG. 1, detection electrodes Rx each constituting the sensor SE are provided on the display surface of the display panel PNL. The display device DSP of this type is called an on-cell type device. However, although as will be described in connection with another embodiment to be described later, an in-cell type device of a type in which electrodes constituting the sensor SE are provided inside the display panel PNL may also be employed.

The display panel PNL is provided with a first substrate SUB1, second substrate SUB2 arranged to be opposed to the first substrate SUB1, and liquid crystal layer formed between the first substrate SUB1 and second substrate SUB2. It should be noted that the first substrate SUB1 may be called an array substrate, and the second substrate SUB2 may be called a counter-substrate. The drive IC chip IC1 configured to drive the display panel PNL is mounted on, for example, the second substrate SUB2.

The flexible wiring substrate FPC1 connects the display panel PNL and host device HOS to each other. The flexible wiring substrate FPC2 connects the sensor SE and host device HOS to each other. The touch IC chip IC2 is mounted on the flexible wiring substrate FPC2. The flexible wiring substrate FPC3 connects the backlight unit BL and host device HOS to each other. The host device HOS may be called an application processor.

The display panel PNL is provided with a display area (active area) DA configured to display an image. A plurality of detection electrodes Rx are arranged in, for example, a first direction X, and second direction Y perpendicular to each other in this display area DA. That is, a plurality of detection electrodes Rx are arranged in a matrix form.

The backlight unit BL is arranged on the back side of the first substrate SUB1. As the backlight unit BL, backlight units of various forms can be applied, and there are a backlight unit BL utilizing a light-emitting diode (LED) as the light source, backlight unit BL utilizing a cold-cathode fluorescent tube (CCFL), and the like.

The battery is accommodated in a battery housing (not shown), and is connected to an external power supply circuit through power supply terminals of the liquid crystal display device DSP. The battery BATT is a secondary battery (may be called a rechargeable battery), and this battery BATT can be charged through a charger configured to convert a commercial alternating-current (AC) power-supply voltage into a direct current (DC) voltage or a charging circuit configured to convert a DC power-supply voltage of other electronic devices into an appropriate voltage.

FIG. 2 is a view schematically showing a signal system and power supply system of the liquid crystal display device DSP shown in FIG. 1 in an extracting manner. In particular, a functional block in the drive IC chip IC1 is shown in detail.

As terminals configured to connect the drive IC chip IC1 and display panel PNL to each other, there exist a terminal SOUT, terminal SEOUT, terminal VGHOT, terminal VGLOT, terminal VcomT, terminal TSVcomT, and the like.

Terminal SOUT outputs an image signal (may be called a source signal). That is, an image signal used to display an image is written to a pixel circuit of the display panel PNL through this terminal SOUT. In practice, as an image signal, image signals of red (R), green (G), and blue (B) exist. Accordingly, as the pixel circuit, pixel circuits corresponding to filters of R, G, and B exist.

Terminal SEOUT outputs a panel control signal (may be called a panel drive signal) configured to drive the display panel PNL. Gate elements connected to the scanning lines of the display panel PNL, and gate elements connected to the source lines are controlled on the basis of this panel control signal, whereby a write operation and holding operation of the image signal are obtained.

Terminal VGHOT outputs a positive DC voltage, and terminal VGLOT outputs a negative DC voltage. These voltages are utilized to drive the gate elements, and pixel circuits. As will be described later, these positive voltage, and negative voltage are voltages of ±3 volt to ±9 volt according to the product and specifications, and are boosted in the power supply circuit.

Terminal VcomT outputs a common DC voltage. This common voltage is supplied to a common electrode in the display panel PNL.

From terminal TSVcomT, a signal configured to drive the sensor SE is output. This signal is called a sensor drive signal Tx. It should be noted that this terminal TSVcomT, and terminal VcomT are integrated with each other in some cases.

Next, the inside of the drive IC IC1 will be described below. An input interface 211 is connected to the host device HOS through terminals P1 and P2. The host device HOS includes a power supply terminal VT2, and a power-supply voltage from an external power supply circuit 100 is supplied thereto through this power-supply terminal VT2.

The host device HOS supplies an external clock to the input interface 211, and an input signal processing section 212 through terminal P1. Besides, the host device HOS can carry out intercommunication with the input interface 211, and transmit image data and a command to the input interface 211 through the input terminal P2. It should be noted that the communication between the host device HOS and the drive IC chip IC1 is carried out on the basis of an interface standard such as Mobile Industry Processor Interface (MIPI) or the like.

The input interface 211 transfers image data to the input signal processing section 212, and transfers a command to a timing control section 222.

The output side of the input signal processing section 212 is connected to an image processing section 213. The image processing section 213 can subject image data to digital processing, and can subject the image data to composition processing, size processing, image-quality adjustment processing, and the like. Besides, the image processing section 213 obtains an image signal by subjecting image data which has been subjected to digital processing to analog conversion. This image signal is output to the aforementioned output terminal SOUT through a source amplifier included in the image processing section 213.

The output timing of the image signal from the image processing section 213 is determined on the basis of a timing signal from the timing control section 222. The image processing section 213 can receive a power-supply voltage Vcc through a terminal VT1, and switch SW2.

The power-supply voltage Vcc from the external power supply circuit 100 is applied to terminal VT1 through, for example, a main switch SW1. Switch SW1 can be on/off-controlled by a control signal from, for example, the touch IC chip IC2. According to another embodiment, switch SW1 may also be on/off-controlled by a timing signal from the timing control section 222 or by a control signal from the host device HOS.

The timing control section 222 can collectively make all the circuit blocks in the drive IC chip IC1 operate in synchronization with each other on the basis of a command received from the host device HOS. For example, the timing control section 222 supplies a timing signal to the image processing section 213, a panel control section 223, and the like. Thereby, the timing control section 222 can determine output timing of the image signal, output timing of the panel control signal configured to drive the display panel PNL, and an output mode of the panel control signal, and the like.

That is, the timing control section 222 supplies a timing signal indicating a write period of the image signal to the panel control section 223. Besides, the timing control section 222 can designate or switch the output mode of the panel control section 223. The output mode implies a method or a form by which or in which the image signal is written to the display panel PNL. The image signal can be written to part of the display area or can be written to the whole part of the display area according to the output mode.

The timing control section 222 receives a basic clock from a local oscillator (OSC) 230 in the drive IC chip IC1. The timing control section 222 generates various timing signals on the basis of the basic clock. Besides, the timing control section 222 can carry out control to increase or decrease an oscillation frequency of the local oscillator 230.

The timing control section 222 is connected to an input interface 221. The input interface 221 is connected to the host device HOS through a terminal P3. Besides, the input interface 221 can carry out intercommunication with the host device HOS. The input interface 221 is connected to the touch IC chip IC2 through a terminal P4. Besides, the input interface 221 can carry out intercommunication with the touch IC chip IC2.

Accordingly, the input interface 221 can receive a command from the host device HOS, and transfer this command to the timing control section 222 and/or the touch IC chip IC2. Accordingly, an operation of the touch IC chip IC2 can be controlled on the basis of the command from the host device HOS.

The touch IC chip IC2 includes a power supply terminal VT3 configured to receive the power-supply voltage Vcc from the external power supply circuit 100.

Next, a voltage generation system in the drive IC chip IC1 will be described below. As the voltage generation system, an internal power supply circuit 401, and gamma voltage generation circuit 402 are shown.

Although the internal power supply circuit 401 includes a plurality of voltage generation sections, they will be described later (in connection with FIG. 4). The internal power supply circuit 401 is connected to capacitors VC1 and VC2 each retaining a smoothed voltage through terminals P5 and P6. It should be noted that although in FIG. 2, the two terminals P5 and P6, and two capacitors VC1 and VC2 are shown, the number of these terminals and capacitors are determined according to the number of internal power supply circuits, and scale of the power supply circuit. Besides, the internal power supply circuit 401 includes a voltage boosting circuit configured to boost the external voltage. The internal power supply circuit 401 is connected to a plurality of capacitors through terminals P71 to P7$n$ used for the voltage boosting operation.

The gamma voltage generation circuit 402 receives a voltage generated in the internal power supply circuit 401 through a switch SW3. The gamma voltage generation circuit 402 corrects the received voltage on the basis of a gamma parameter, and supplies the corrected voltage to a source amplifier in the image processing section 213. The gamma parameter is stored in a nonvolatile memory (not shown). Alternatively, the gamma parameter can be received from the host device HOS through the input interface 211. It should be noted that a power supply used for the operation of the gamma voltage generation circuit 402 is acquired from the power supply circuit 401 or from terminal VT1.

The internal power supply circuit 401 described above acquires the external voltage Vcc through terminal VT1 in order to generate various voltages. Besides, the internal power supply circuit 401 carries out voltage conversion for converting the external voltage by using a voltage regulator, and the like for boosting the external voltage by using a DC-DC converter to thereby generate a desired plurality of power-supply voltages (an internal configuration example of the internal power supply circuit 401 is shown in FIG. 4).

The internal power supply circuit 401 can supply the generated power-supply voltage to a touchsensor driver 245. The touchsensor driver 245 can output the sensor drive signal Tx through terminal TSVcomT. The sensor drive signal Tx is supplied to a drive electrode (may also be called a common electrode) of the sensor SE. The operation timing of the touchsensor driver 245 is controlled on the basis of a timing signal from the timing control section 222.

A detection signal Rxs output from the detection electrode Rx of the sensor SE is input to the touch IC chip IC2. The touch IC chip IC2 analyzes the detection signal Rxs to thereby determine operation input. The connection line between the touch IC chip IC2 and the detection electrode of the sensor SE is also utilized sometimes in the case of self-sensing to be described later.

Regarding the internal power supply circuit 401, and the gamma voltage generation circuit 402, their operation periods can be controlled and/or their output voltages can be controlled on the basis of a timing signal from the timing control section 222.

Each of the image processing 213, the gamma voltage generation circuit 402, and a regulator (to be described later) inside the internal power supply circuit 401 includes a constant-current source circuit, and a constant current generated therein is supplied to blocks in the driver IC chip requiring the current.

In FIG. 2, a plurality of constant-current source circuits are brought together in one block to be shown as a constant-current source circuit 261. Here, the constant-current source circuit 261 can reduce the operating current during a predetermined period during which a timing signal is supplied thereto from the timing control section 222. Thereby, the power-supply voltages of the image processing section 213, gamma voltage generation circuit 402, and regulator inside the internal power supply circuit 401 lower, whereby the image processing section 213, the gamma voltage generation circuit 402, and the regulator can shift from the normal operation to the low energy consumption operation. Besides, a configuration in which the output power-supply voltage is turned off by turning off the operating current of the constant-current source circuit 261 may also be employed.

FIG. 3 shows circuit blocks inside the image processing section 213, and in the periphery thereof. The image data is input into the drive IC chip IC1 by the input interface 211, and input signal processing section 212 operating in synchronization with the external clock. The image data in the input signal processing section 212 is transferred to a display RAM 2131 in synchronization with the internal clock. Here, the image data changes from data synchronized with the external clock to data synchronized with the internal clock.

The image data read from the display RAM 2131 is subjected to image quality adjustment processing, and the like in a digital signal processing section 2132. Besides, the image data is subjected to data interpolation processing, and the like in the digital signal processing section 2132 in some cases.

The image data output from the digital signal processing section 2132 is subjected to digital-to-analog conversion in a digital-to-analog conversion circuit 2133, and is converted into an image signal.

It should be noted that the display RAM 2131 is not provided in some cases. In such a case, the input signal processing section 212 is directly connected to the digital signal processing section 2132.

At this time, the image signal is subjected to gamma correction to thereby be output. The digital-to-analog conversion circuit 2133 uses the power-supply voltage Vcc. Besides, when generating a gamma-corrected image signal, the digital-to-analog conversion circuit 2133, and a source amplifier 2134 select a gamma-correction parameter according to a value of the image data, control the gamma voltage according to the selected gamma-correction parameter, and output the controlled gamma voltage as an image signal. The image signal is gain-controlled by the source amplifier 2134, is output from terminal SOUT, and is supplied to the display panel PNL.

The display RAM 2131, the digital signal processing section 2132, and the digital-to-analog conversion circuit 2133 receive the internal clock generated by the local oscillator 230 through a switch SW5.

The local oscillator 230 is provided with a frequency divider inside, and can switch the frequency of an output clock. This switching control is carried out by a timing signal from the timing control section 222. Besides, it is also possible to control switch SW5 to turn off the operation clock of the display RAM 2131, digital signal processing section 2132, and digital-to-analog conversion circuit 2133.

The power-supply voltage of the digital-to-analog conversion circuit 2133 and source amplifier 2134 may be configured to be constant by the constant-current source circuit 261 for determining the power-supply voltage. In this case, by switching the constant current of the constant-current source circuit 261, it is possible to carry out switching control of the power-supply voltage of the digital-to-analog conversion circuit 2133, source amplifier 2134, and the like.

The constant current output from the constant-current source circuit 261 is also supplied to the power supply system of the regulator inside the internal power supply circuit 401, and gamma voltage generation circuit 402 as described in connection with FIG. 2, and a configuration in which the power-supply voltage is set on the basis of this constant current may also be employed. In this case, by switching the constant current of the constant-current source circuit 261, it is possible to carry out switching control of the power-supply voltage of each of the regulator inside the internal power supply circuit 401, and gamma voltage generation circuit 402. That is, in this case, by switching the constant current of the constant-current source circuit 261, it is possible to switch the image processing section 213, internal power supply circuit 401, gamma voltage generation circuit 402, and the like to the low voltage operation, normal voltage operation, and off-state. As the result, this system came to have the capability which power consumption saves.

The power-off of the gamma voltage generation circuit 402 is realized by turning off switch SW3 by the timing signal.

FIG. 4 shows circuit blocks inside the internal power supply circuit 401, and in the periphery thereof. The internal power supply circuit 401 includes an internal circuit series regulator 4011, gamma voltage series regulator 4012, and panel DC-DC converter 4013. The panel DC-DC converter 4013 boosts the power-supply voltage Vcc, generates a positive voltage, and negative voltage for the panel, and outputs the generated voltages to terminals VGHOT and VGLOT. Besides, the panel DC-DC converter 4013 also generates a common voltage for the common electrode of the display panel PNL, and outputs the generated common voltage to terminal VcomT.

The gamma voltage series regulator 4012 utilizes the power-supply voltage Vcc from the external power supply circuit 100 to generate a voltage to be used as the gamma voltage. This voltage for the gamma voltage is input to the gamma voltage generation circuit 402 through the switch SW3.

The internal circuit series regulator 4011 generates power-supply voltages to be supplied to the respective circuits inside the drive IC chip IC1. For example, the power-supply voltage generated in the internal circuit series regulator 4011 is supplied to the sensor driver 245. The internal circuit series regulator 4011 can also generate power-supply voltages of the input interface 211, input signal processing section 212, local oscillator 230, input interface 221, timing control section 222, panel control section 223, and the like.

Here, the operations of the internal circuit series regulator 4011, gamma voltage series regulator 4012, and panel DC-DC converter 4013 can be on/off-controlled by a timing signal from the timing control section 222. Besides, the internal circuit series regulator 4011, the gamma voltage series regulator 4012, and the panel DC-DC converter 4013 may also be configured in such a manner that they are switched to the low voltage operation, normal operation, and off-state by controlling the constant current of the constant-current source circuit 261. Furthermore, it is possible for the panel DC-DC converter to carry out the low speed operation, and reduce energy consumption by switching the clock frequency from the local oscillator 230. Besides, in the panel DC-DC converter 4013, the operation frequency thereof can also be selectively switched to ½, ¼, ⅛, 1/16, 1/32, and the like of the normal frequency. Alternatively, the oscillation frequency of the local oscillator 230 may also be selectively switched to ½, ¼, ⅛, 1/16, 1/32, and the like of the normal frequency.

Besides, in the internal circuit series regulator 4011, gamma voltage series regulator 4012, and panel DC-DC converter 4013, it is possible to carry out the above-mentioned control separately from each other by means of the timing control section 222.

Next, an operation to be carried out when the above display device shifts from the sleep state to the wakeup operation will be described below.

It is assumed that, on the time axis TIM1 of the time chart of FIG. 5A, the display device DSP is in the sleep state up to the time point t1. In the sleep state, the display device DSP carries out self-sensing (state 5A1). This self-sensing is carried out on the basis of the operation of the touch IC chip IC2. Self-sensing implies, as will be described later, a detection method of driving the detection electrode of the sensor SE, and detecting a change in capacitance of the electrode. For example, when a substance such as a finger of the user approaches a position close to the display surface (state 5A2), the capacitance of the detection electrode changes. Until this change in capacitance is detected, all the circuits inside the drive IC chip IC1 may be in the off-state. Accordingly, at this time, switch SW1 is in the off-state (power-off) on the basis of the control of the touch IC chip IC1 or the control of the host device HOS. In this case, the touch IC chip IC2, and the host device HOS may be directly connected to each other so that they can mutually carry out communication with each other.

When a change in capacitance of the detection electrode is detected by the touch IC chip IC2 at the time point t1, for example, the touchsensor driver 245 in the drive IC chip IC1 is turned on (state 5A3). Upon detection of the capacitance of the detection electrode by self-sensing, the touch IC chip IC2 notifies the host device HOS of the fact.

Thereby, the touch IC chip IC2 or the host device HOS turns on switch SW1, and sends a command to the timing control section 222. The timing control section 222 activates the whole or part of the internal power supply circuit 401 to thereby enable the operation of the touchsensor driver 245. At this stage, the power supply for the panel control section 223, and image processing section 213 is in the off-state.

When the touchsensor driver 245 is activated, mutual sensing is enabled (state 5A4). The mutual sensing implies, as will be described later, a detection method having the procedure in which the drive electrode and the detection electrode are arranged close to each other, and the drive electrode is driven to thereby detect a changing state of the potential of the detection electrode. When the drive electrodes and the detection electrodes are arranged in a matrix form in an intersecting manner, the operation of the sensor SE enables detection of the coordinate position of the operation input. This mutual sensing is started at, for example, the time point t3. The period from the time point t2 to the time point t3 is a preparation period of the drive IC chip IC1.

The touch IC chip IC2 monitors the state of the detection signal Rxs to determine whether or not the operation input is present. The touch IC chip IC2 notifies the host device of presence/absence of the operation input. When the mutual sensing state continues for a fixed period of time until the time point t5, and if no operation input is detected by the time point t5 (state 5A5), the touch IC chip IC2 or the host device HOS turns off the drive IC chip IC1 (i.e., switch SW1 is turned off). Thereafter, a state where the self-sensing (state 5A1) is carried out only by the touch IC chip IC2, i.e., the sleep state is brought about again. At this time, the drive IC chip IC1 is in the power-off state.

Accordingly, when the operation described above is executed, consumption of the battery can be reduced.

FIG. 5B shows an example in which the operation input is detected in the mutual sensing by the time point t5 on the time axis TIM2 of the time chart.

Accordingly, this example is identical to the example shown in FIG. 5A in the period up to the time point t3 in FIG. 5B. It is assumed that after the time point t3, operation input is detected at, for example, a time point t4 (state 5B1) in the mutual sensing. Then, mutual sensing is maintained, and the respective circuits inside the drive IC chip IC1 are controlled to be brought to the regular operational state. That is, the drive IC chip IC1 is activated on the basis of a command from the host device HOS, and the timing control section 222 controls the operation timing of each section.

Figure 5C:
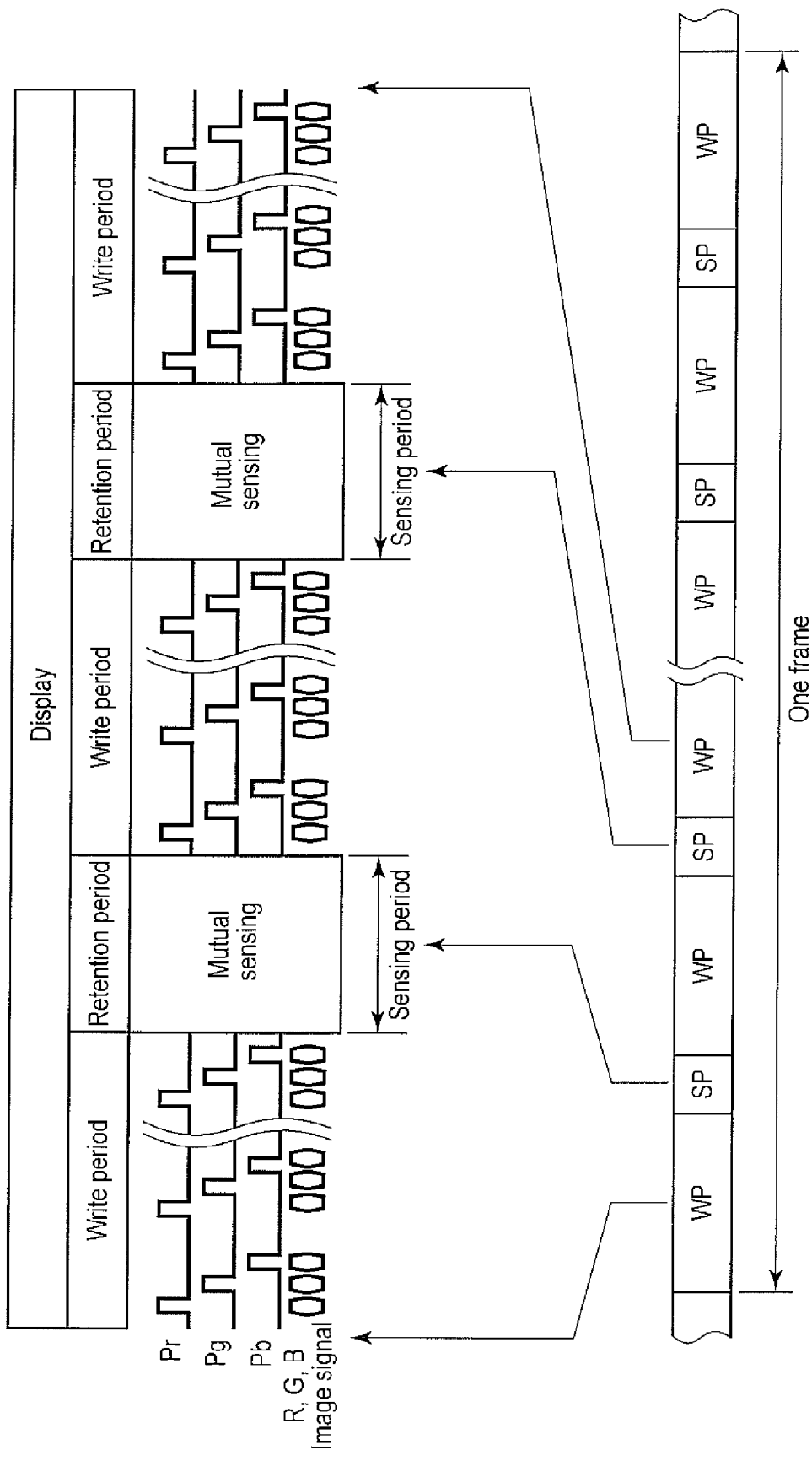
FIG. 5C is a timing chart showing an example of an operation to be carried out when the display device is in the wakeup state.

FIG. 5C shows a time chart of the operation to be carried out when the device has shifted to the normal operating state, i.e., the state where write and display of the image signal, and operation input are to be detected. A write period of the image signal in one frame period is time-divided into a plurality of periods, and a mutual sensing period SP is set between a write period WP (may also called a display period), and another write period WP (may also be called a display period). As the image signal to be written to the pixel circuit, pixel signals of red (R), green (G), and blue (B) are shown. Besides, timing pulses Pr, Pg, and Pb used to write the respective pixel signals to their corresponding pixel circuits are shown.

The period between a write period WP, and another write period WP is also a retention period of the written pixel signals.

Here, the display device may also be configured in such a manner that during the mutual sensing period SP, in the image processing section 213, the power-supply voltage is switched to the off-state or to the low voltage operation, and in the panel control section 223, the power-supply voltage is switched to the off-state or to the low voltage operation. The timing signal used to turn off the power-supply voltage, and the timing signal used to switch the operation to the low voltage operation are output from the timing control section 222.

Besides, when the energy consumption of the display panel PNL in the mutual sensing period SP is compared with the energy consumption of the display panel PNL in the write period, the ratio is about 1 to 10. Accordingly, when the above-mentioned energy-saving operation (the image processing section 213, and the panel control section 223 are switched to the power-off state or to the low voltage operation in the mutual sensing period SP) shown in FIG. 5C is executed, consumption of the battery can be reduced as compared with the conventional case.

<Self-Sensing and Mutual Sensing>

Here, self-sensing will be described with reference to FIGS. 6A to 9, and mutual sensing will be described with reference to FIGS. 10 to 13.

<Self-Detection System>

The principle of the self-detection system will be described below. The self-detection system utilizes capacitance Cx1 possessed by the detection electrode Rx. The self-detection system also utilizes capacitance Cx2 occurring on the finger or the like of the user coming close to the detection electrode Rx.

FIG. 6A and FIG. 6B each show the state where the user's finger is neither in contact with nor in close proximity to the top surface of the display panel. Accordingly, the electrostatic capacitance Cx2 has not occurred between the detection electrode Rx and the finger. FIG. 6A shows the state where the power supply Vdd and the detection electrode Rx are connected to each other by the control switch SWc. FIG. 6B shows the state where the power supply Vdd and the detection electrode Rx are separated from each other, and the detection electrode Rx is connected to the capacitor Ccp by the control switch SWc.

In the state of FIG. 6A, capacitance Cx1 is charged, and capacitance Cx1 is discharged in the state of FIG. 6B. Here, that capacitance Cx1 is charged implies that a certain write signal is written to the detection electrode Rx. Besides, that capacitance Cx1 is discharged implies that a read signal indicating a change in electrostatic capacitance occurring on the detection electrode Rx is read. With respect to the above-mentioned write signal, and read signal, the line configured to acquire the detection signal Rxs shown in FIG. 1 is utilized.

Figure 7A:
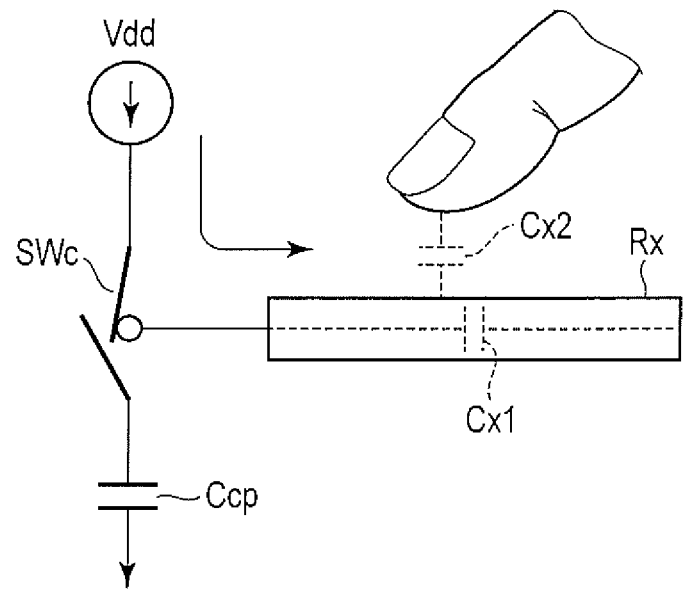
FIG. 7A is a view for explaining the self-detection system applicable to the display device, and is a view showing a state where the detection electrode is charged when electrostatic capacitance coupling occurs between the detection electrode and the finger.
Figure 7B:
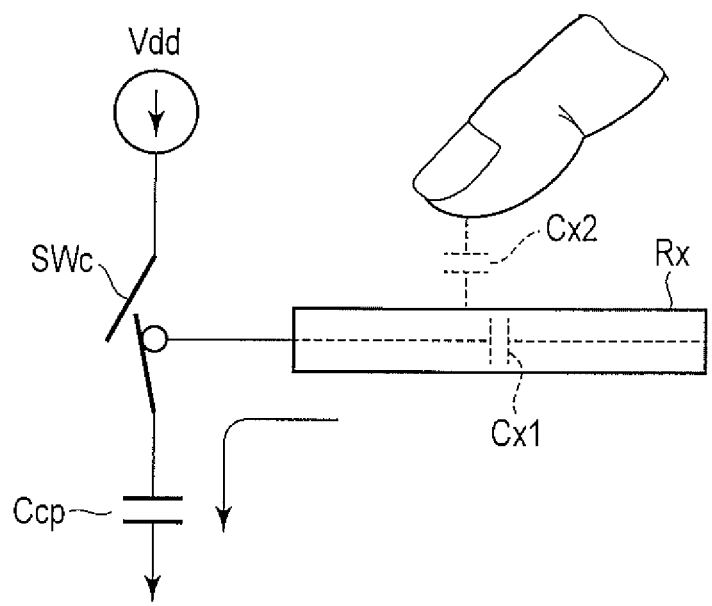
FIG. 7B is a view subsequent to FIG. 7A, for explaining the self-detection system, and is a view showing a state where discharge from the detection electrode is carried out.

On the other hand, FIG. 7A, and FIG. 7B each show the state where the user's finger is in contact with or in close proximity to the top surface of the display panel PNL. Accordingly, the electrostatic capacitance Cx2 has occurred between the detection electrode Rx, and the finger. FIG. 7A shows the state where the power supply Vdd and the detection electrode Rx are connected to each other by the control switch SWc. FIG. 7B shows the state where the power supply Vdd and the detection electrode Rx are separated from each other, and the detection electrode Rx is connected to the capacitor Ccp by the control switch SWc.

In the state of FIG. 7A, capacitance Cx1 is charged, and capacitance Cx1 is discharged in the state of FIG. 7B. Here, the voltage change characteristics of capacitance Ccp at the time of discharge shown in FIG. 7B evidently differ from the voltage change characteristics of capacitance Ccp at the time of discharge shown in FIG. 6B because of the presence of capacitance Cx2. Accordingly, in the self-detection system, the fact that the voltage change characteristics of capacitance Ccp differ depending on the presence/absence of capacitance Cx2 is utilized to determine whether or not input position information is present (for example, presence/absence of operation input).

FIG. 8A shows an example of a basic circuit which realizes the self-detection system. This circuit is provided in, for example, the touch IC chip IC2 shown in FIG. 1.

As shown in FIG. 8A, the detection electrode Rx is connected to one terminal of voltage dividing capacitance Cp, and is connected to one input terminal of a comparator COMP. The detection electrode Rx has its own capacitance Cx. The other input terminal of the comparator COMP is connected to a supply terminal of a reference voltage Vref.

The other terminal of capacitance Cp is connected the power supply line of voltage Vcc through a switch SW1. Besides, the other terminal of capacitance Cp is connected to one terminal of capacitance Cc through a resistor Rc. The other terminal of capacitance Cc is connected to the standard potential (for example, ground potential).

A switch SW2 is connected between the other terminal of capacitance Cp and the standard potential, and a switch SW3 is connected between the one terminal of capacitance Cp and the standard potential. Switches SW1, SW2, and SW3, and the comparator COMP are provided in the control circuit inside the touch IC chip IC2.

Next, the operation will be described below. Switch SW1 is turned on with a fixed period, and can charge capacitance Cc. When capacitance Cc is charged, switches SW2, and SW3 are turned off. When capacitance Cc is charged up, all switches SW1, SW2, and SW3 are turned off, and the electrical charge of capacitance Cc is retained.

Subsequently, switches SW2, and SW3 are turned on for a fixed period of time (switch SW1 further kept in the off-state). Then, almost all the electrical charges of capacitance Cp, and capacitance Cx are discharged, and part of the electrical charge of capacitance Cc is discharged through the resistor Rc.

Subsequently, all switches SW1, SW2, and SW3 are turned off. Then, the electrical charge of capacitance Cc moves to capacitance Cp, and capacitance Cx. The equivalent circuit at this time can be expressed as shown in FIG. 8B. Thereafter, voltage Vx of capacitance Cx is compared with the reference voltage Vref or the threshold voltage Vth in the comparator COMP.

As shown in the equivalent circuit of FIG. 8B, when all switches SW1, SW2, and SW3 are brought to the off-state, the electrical charge of capacitance Cc moves to capacitance Cp, and capacitance Cx, and then a change in voltage Vx of capacitance Cx is compared with the reference voltage Vref in the comparator COMP. The above-mentioned operation is repeated until the condition Vx<Vref is satisfied.

That is, after charging of capacitance Cc is executed, switches SW2, and SW3 are kept in the on-state for a fixed period of time (switch SW1 is still kept in the off-state). Then, almost all the electrical charges of capacitance Cp, and capacitance Cx are discharged, and part of the electrical charge of capacitance Cc is discharged through the resistor Rc. Then, all switches SW1, SW2, and SW3 are turned off. Then, the electrical charge of capacitance Cc moves to capacitance Cp, and capacitance Cx.

The relationships between voltages Vp, Vc, and Vx, and capacitance Cp, Cc, Cx are expressed by following formulas (1) to (3).

$$Vc = Vp + Vx \quad (1)$$

$$Vp:Vx = (1/Cp):(1/Cx) \quad (2)$$

$$Vx = (Cp/(Cp+Cx)) \times Vc \quad (3)$$

As described above, after capacitance Cc is charged up to voltage Vc through switch SW1, when switches SW2, and SW3 are repetitively turned on or off while switch SW1 is kept in the off-state, voltage Vc of capacitance Cc gradually lowers, and voltage Vx of capacitance Cx also lowers. This operation, i.e., the operation of repetitively turning on or off switches SW2, and SW3 after capacitance Cc is charged up to voltage Vc is continued until voltage Vx becomes lower than the reference voltage Vref.

FIG. 9 shows examples of the change waveform of voltage Vc of capacitance Cc, and the output waveform of the comparator COMP. The lateral direction indicates time, and the vertical direction indicates voltage.

When switch SW1 is turned on, the capacitance is charged up to voltage Vcc. Thereafter, all switches SW1, SW2, and SW3 are brought to the off-state, and the electrical charge of capacitance Cc moves to capacitance Cp and capacitance Cx. Next, the change in voltage Vx of capacitance Cx is compared with the reference voltage Vref in the comparator COMP.

The characteristics of the change in voltage Vc or the degree of the change in voltage Vc changes depending on the total capacitance Cp and Cx. The change in capacitance Cc also exerts an influence on voltage Vx of capacitance Cx. Besides, capacitance Cx differs depending on the degree of the approach of the user's finger to the detection electrode Rx.

Accordingly, as shown in FIG. 9, when the finger is far from the detection electrode Rx, the characteristics VCP1 with slow changes are obtained, and when the finger is close to the detection electrode Rx, the characteristics VCP2 with quick changes are obtained. The reason why the rate of decrease of the Vc is larger in the case where the finger is close to the detection electrode Rx as compared with the case where the finger is far from the detection electrode Rx is that capacitance Cc has been increased by the capacitance of the finger.

The comparator COMP compares voltage Vp with the reference voltage Vref or the threshold voltage Vth in synchronization with repetitive turning on/off of switches SW2, and SW3. When Vp is greater than Vref (Vp>Vref), the comparator obtains an output pulse. However, when Vp becomes lower than Vref (Vp<Vref), the comparator COMP stops the output pulse.

The output pulse of the comparator COMP is monitored by a measuring circuit (not shown) inside the touch IC chip IC2 or by a measuring application. That is, after charging capacitance Cc once, repetitive discharging is carried out by switches SW1, and SW2 for a short period of time, and voltage Vp is repetitively measured.

At this time, the period (MP1 or MP2) during which the output pulses can be obtained from the comparator COMP may be measured or the number of the output pulses (the number of pulses from the time at which Cc is charged up to the time at which Vp becomes lower than Vref (Vp<Vref)) of the comparator COMP may be measured.

When the finger is far from the detection electrode Rx, the period during which the output pulses can be obtained from the comparator COMP is long, and when the finger is close to the detection electrode Rx, the period during which the output pulses can be obtained from the comparator COMP is short. Alternatively, when the finger is far from the detection electrode Rx, the number of the output pulses of the comparator COMP is large, and when the finger is close to the detection electrode Rx, the number of the output pulses of the comparator COMP is small.

Accordingly, it is possible to determine the degree of proximity of the finger to the plane of the sensor SE by the level of the detection pulse. Besides, at the same time, by arranging the detection electrodes Rx two-dimensionally (in a matrix form), it is possible to detect the two-dimensional position of the finger on the plane of the sensor SE.

As described above, although it is detected whether or not the user's finger influences the detection electrode Rx, the detection time is on the order of several tens of µs to several ms.

<Mutual Detection System>

FIGS. 10 to 12 each show an example of the mutual detection system. Determination of the input position information is carried out by writing a write signal to a common electrode CE (in the case of a divided-electrode type, shown as segmented electrodes C [C1, C2, C3 . . . ]), and reading a read signal occurring on each detection electrode Rx, and indicating a change in electrostatic capacitance.

In the example shown in FIG. 10, common electrodes CE, and detection electrodes Rx are utilized. The common electrodes CE includes a plurality of stripe-shaped segmented electrodes C (C1, C2, C3, . . . ). The plurality of segmented electrodes (C1, C2, C3, . . . ) are arranged in the scanning (drive) direction (here, the second direction Y).

On the other hand, the detection electrodes Rx include matrix-like detection electrodes. Here, the detection electrodes Rx are arranged in the first direction X, and second direction Y. The plurality of detection electrodes Rx are opposed to the segmented electrodes C (C1, C2, C3, . . . ) with a space held between them. Accordingly, between the segmented electrodes C, and detection electrodes Rx, basically capacitance Cc exists.

The segmented electrodes C are scanned by using a pulse-like write signal Tx at predetermined intervals. Now, it is assumed that the user's finger exists in close proximity to a particular detection electrode Rx. Then, when a pulsed write signal Tx is supplied to the segmented electrodes C (C1, C2, C3, . . . ), a pulsed read signal (detection signal) Rxs a level of which is lower than pulses obtained from other detection electrodes is obtained from the particular detection electrode Rx.

In the mutual detection system, the pulsed read signal Rxs having the low detection-level can be treated as information (detection pulse) about the input position DETP based on the finger.

The above-mentioned capacitance Cx differs depending on whether the finger is close to the detection electrode Rx or the finger is far from the detection electrode Rx. Accordingly, the level of the detection pulse differs depending on whether the finger is close to the detection electrode Rx or the finger is far from the detection electrode Rx. Therefore, it is possible to determine the degree of proximity of the finger to the plane of the sensor SE by the voltage level of the pulsed read signal Rxs. Of course it is possible to detect the two-dimensional information (may be called a coordinate position) about the finger on the plane of the sensor SE on the basis of the electrode drive timing determined by the pulsed write signal, and the output timing of the pulsed read signal Rxs.

It should be noted that the detection electrodes Rx need not be divided into the matrix form. It is more desirable that the detection electrodes Rx be electrically connected to each other in the direction intersecting the segmented electrodes C by using switches or the like. Thereby, it is possible to reduce the number of detectors to be utilized for detection of the read signal Rxs to a large extent in the mutual detection system.

That is, as shown in FIG. 11, the common electrodes CE may not be segmented into a plurality of electrodes. The common electrode CE is formed of a single electrode, and is used in common with all the pixels PX. In this case too, by supplying the write signal Tx to the common electrode CE, it is possible for the liquid crystal display device DSP to switch the system to the mutual detection system to thereby determine the input position information. Of course it is also possible for the liquid crystal display device DSP to switch the system to the self-detection system to thereby determine the input position information.

FIG. 12 shows still another configuration example of the mutual detection system applicable to the display device.

In this example, a plurality of stripe-shaped (or strip-shaped) detection electrodes Rx are arranged. The detection signal Rxs can be obtained from each individual detection electrode Rx. The detection signal Rxs from each individual detection electrode Rx is output when the segmented electrodes C (C1, C2, C3, . . . ) are operated. The detection electrode to which the user's finger is in close vicinity can output a detection signal of a level lower than other detection electrodes. Accordingly, it is possible to detect the two-dimensional information (may be called a coordinate position) about the finger on the plane of the sensor SE on the basis of the scanning timing of the segmented electrodes C (C1, C2, C3, . . . ), and the position of the detection electrode which has output the low-level detection signal.

<Basic Concept of Feature>

FIG. 13 is view for explaining a representative concept included in the aforementioned display device.

That is, the display panel PNL, and the input sensor SE are included in one embodiment. The display panel includes display element arrangement for displaying an image. The input sensor is provided in the display panel, includes a drive electrode, and detection electrode, and outputs a detection signal from the detection electrode.

Besides, in the embodiment, the image processing section 213, panel control section 223, internal power supply circuit 401, and touchsensor driver 245 are included. The gamma voltage generation circuit 402 can be included in the image processing section 213.

The image processing section 213 outputs an image signal to be written to the display panel PNL. The panel control section 223 outputs a panel drive signal used to drive the display panel PNL. The touchsensor driver 245 outputs at least a sensor drive signal used to drive the input sensor SE. The internal power supply circuit 401 outputs a power supply voltage to be supplied to each of the image processing section 213, panel control section 223, display panel PNL, and sensor driver 245.

Here, an energy saving control section 500 is provided. This energy saving control section 500 can include all of or a combination of the host device HOS, touch IC chip IC2, timing control section 222, local oscillator 230, constant-current source circuit 261 described in connection with FIG. 2.

<A Plurality of Representative Embodiments of Energy Saving Control Section 500>

(1) First aspect of the example . . . The energy saving control section 500 can carry out the following control. That is, it is possible to set a first period in which the detection signal is to be captured from the detection electrode of the input sensor within one frame period, and a second period (may be called a second period including a zero period or a finite period) including a zero period except the first period. In the first period, it is possible to control at least the power supply voltage of the image processing section 213, and panel control section 223, and the power supply voltage to be supplied from the internal power supply circuit 401 to the display panel PNL to the off-state or to the low voltage.

(2) Second aspect of the example . . . When the display device is in the sleep state, the touch IC chip IC2 can receive the external voltage from the external power supply circuit 100, and execute the self-sensing described in connection with FIG. 5A, and FIG. 5B. While executing the self-sensing, the touch IC chip IC2 can make switch SW1 in the off-state. Thereby, the drive IC chip IC1 is brought to the off-state, and electrical energy saving is carried out. Switch SW1 may be provided inside the drive IC chip IC1. That is, in the sleep state, only the touch IC chip IC2 operates by the electrical power from the external power supply circuit 100 (may be called a battery power supply).

(3) Third aspect of the example . . . When the display device is in the sleep state, the touch IC chip IC2 receives the external voltage from the external power supply circuit 100, and can execute the self-sensing described in connection with FIG. 5A, and FIG. 5B. While the touch IC chip IC2 executes the self-sensing, the host device HOS makes switch SW1 in the off-state, and the electrical energy saving state of the drive IC chip IC1 can be set.

(4) Fourth aspect of the example . . . Switch SW1 is omitted in some cases. In such a case, the internal power supply circuit 401 is in the operating state. Accordingly, at this time, the timing control section 222 is in the operating state. The touch IC Chip IC2 can notify the timing control section 222 that the self-sensing is being executed.

While the touch IC chip IC2 executes the self-sensing, the timing control section 222 can make switches SW2, and SW3 in the off-state. Furthermore, the timing control section 222 can carry out control to bring the panel control section 223, and the internal power supply circuit 401 to the operating state of the low voltage operation and/or the low frequency operation. The operating state of the panel control section 223, and the internal power supply circuit 401 is executed when the timing control section 222 controls the constant-current source circuit 261 and/or the local oscillator 230.

Thereby, the energy consumption of the image processing section 213, panel control section 223, internal power supply circuit 401, and sensor driver 245 inside the drive IC chip IC1 is greatly saved.

(5) Fifth aspect of the example . . . In the mutual sensing period, the touchsensor driver 245 operates by the power supply voltage from the internal power supply circuit 401. In the mutual sensing period, the power supply voltage is supplied from the internal power supply circuit 401 to the touchsensor driver 245 on the basis of the control of the timing control section 222. However, the image processing section 213, the panel control section 223, and the gamma voltage generation circuit 402 are controlled to be in the operating state of the low voltage operation and/or the low frequency operation on the basis of the control of the timing control section 222.

Accordingly, in the mutual sensing state too, the energy consumption of the image processing section 213, panel control section 223, internal power supply circuit 401, and sensor driver 245 inside the drive IC chip IC1 is greatly saved.

(6) Sixth aspect of the example . . . In the normal operation period too, the energy consumption is saved. The normal operation period includes the sensing period (first period) for detecting the operation input within one frame period, and the write period (second period) for writing the image signal to the pixel circuit.

In the sensing period (first period), at least the power supply voltage of the image processing section 213, and panel control section 223, and the power supply voltage supplied from the internal power supply circuit 401 to the display panel PNL are controlled to the off-state or to the low voltage on the basis of the control of the timing control section 222. In the write period (second period), at least the power supply voltage of the image processing section 213, and panel control section 223, and the power supply voltage supplied from the internal power supply circuit 401 to the display panel PNL are controlled to the normal voltage on the basis of the control of the timing control section 222.

(7) When the operation of the timing control section 222 is to be classified, the timing control section 222 can execute the following operations on the basis of various conditions. The various conditions are those of the case where electrical energy saving is executed), which are described as follows.

(7-1) The timing control section 222 can stop the operations of at least part of the internal power supply circuit 401, image processing section 213, and panel control section 223.

(7-2) The timing control section 222 can lower the operation speed of at least part of the internal power supply circuit 401, image processing section 213, and panel control section 223.

(7-3) The timing control section 222 can, in order to stop the operation of or lower the operation speed of at least part of the internal power supply circuit 401, image processing section 213, and panel control section 223, control the constant current of the respective sections.

(7-4) The timing control section 222 can control the operation frequency of the local oscillator in order to lower the operation speed of at least part of the internal power supply circuit 401, image processing section 213, and panel control section 223.

(7-5) The timing control section 222 can switch the operation of part of the internal power supply circuit 401 to thereby obtain the low-power state in the driver.

(7-6) The timing control section 222 can control the gamma voltage generation circuit 402 configured to generate the power supply voltage of the image processing section to be in the low-power state.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device equipped with an input sensor comprising:
    a display panel including a display element matrix configured to display an image;
    an input sensor provided in the display panel, including a drive electrode and a detection electrode, and configured to output a detection signal from the detection electrode;
    an image processor configured to output an image signal to be written to the display panel;
    a panel controller configured to output a panel drive signal used to drive the display panel;
    a sensor driver configured to output a sensor drive signal used to drive the input sensor;
    an internal power supply circuit configured to output first, second, third and fourth power supply voltages which are supplied to the image processor, the panel controller, the display panel, and the sensor driver, respectively; and
    an energy saving controller configured to set a first period in which the detection signal is captured from the detection electrode of the input sensor, and a second period including a zero period except the first period, and control, in the first period, the first power supply voltage and the second power supply voltage to an off-state or a low voltage, and/or the third power supply voltage to the off-state or the low voltage.

2. The display device equipped with an input sensor of claim 1 further comprising a sensor circuit configured to receive an output of the detection electrode, wherein
    the sensor circuit is included in the energy saving controller, and
    when the display device is in a sleep state,
    the sensor circuit operates by an external voltage from an external power supply circuit,
    executes self-sensing by driving the detection electrode, and
    while executing the self-sensing, the sensor circuit makes a switch configured to supply a power supply voltage to the image processor, the panel controller, the sensor driver, and the internal power supply circuit in an off-state.

3. The display device equipped with an input sensor of claim 1 further comprising a sensor circuit configured to receive an output of the detection electrode, and a host device, wherein
    the sensor circuit, and the host device are included in the energy saving controller, and
    when the display device is in a sleep state,
    the sensor circuit operates by an external voltage from an external power supply circuit,
    executes self-sensing of driving the detection electrode, and
    while the sensor circuit is executing the self-sensing, the host device makes a switch configured to supply a power supply voltage to the image processor, the panel controller, the sensor driver, and the internal power supply circuit in an off-state.

4. The display device equipped with an input sensor of claim 1 further comprising a sensor circuit configured to receive an output of the detection electrode, a timing controller, and an external power supply circuit, wherein
    the sensor circuit, and the timing controller are included in the energy saving controller, and
    when the display device is in a sleep state,
    the sensor circuit operates by an external voltage from an external power supply circuit,
    executes self-serving by driving the detection electrode, and
    part or the whole of the internal power supply circuit receives the external voltage from the external power supply circuit to operate,
    the timing controller receives a power supply voltage from the internal power supply circuit to operate, and
    while the self-sensing is being executed, the timing controller control one or all of the image processor, the panel controller, and the sensor driver to be in an off-state of the power supply voltage or to be in a low voltage operating state.

5. The display device equipped with an input sensor of claim 1 further comprising a gamma voltage generation circuit, a sensor circuit configured to receive an output of the detection electrode, a timing controller, and the sensor driver, wherein
- the sensor circuit and the timing controller are included in the energy saving controller,
- part or the whole of the internal power supply circuit operates by an external voltage from an external power supply circuit,
- the sensor driver and the timing controller operate by the power supply voltage from the internal power supply circuit, and on the basis of control of the timing controller,
- the sensor driver operates by the power supply voltage from the internal power supply circuit, executes mutual sensing between a common electrode and a drive electrode of the sensor circuit, and controls, in the period of the mutual sensing, the image processor, the panel controller, and the gamma voltage generation circuit to be in an operating state of a low voltage and/or a low frequency.

6. The display device equipped with an input sensor of claim 1 further comprising a gamma voltage generation circuit, a sensor circuit configured to receive an output of the detection electrode, a timing controller, and a sensor driver, wherein
- the first period and the second period are set in one frame period,
- the first period is made a sensing period in which the sensor driver is driven to detect operation input,
- the second period is made a write period in which the image signal is written to the display element matrix, and
- in the second period, the first power supply voltage and the second power supply voltage are controlled to a normal voltage, and/or third power supply voltage is controlled to the normal voltage, the normal voltage having a wider range than the low voltage in the first period.

7. The display device equipped with an input sensor of claim 1, wherein
- the image processor, the panel controller, the sensor driver, and the internal power supply circuit are provided in a first IC chip,
- a sensor circuit configured to capture the detection signal from the detection electrode of the sensor is provided in a second IC chip, and
- the energy saving controller is provided in the first IC chip and/or the second IC chip.

8. A control method of a display device, the display device comprising a display panel including a display element matrix configured to display an image; an input sensor provided in the display panel, including a drive electrode and a detection electrode, and configured to output a detection signal from the detection electrode; an image processor configured to output an image signal which is written to the display panel; a panel controller configured to output a panel drive signal used to drive the display panel; a sensor driver configured to output a sensor drive signal used to drive the input sensor; an internal power supply circuit configured to output first, second, third and fourth power supply voltages which are supplied to the image processor, the panel controller, the display panel, and the sensor driver, respectively, the control method comprising:
- setting a first period in which the detection signal is captured from the detection electrode of the input sensor, and a second period including a zero period except the first period; and
- controlling, in the first period, the first power supply voltage and the second power supply voltage to an off-state or a low voltage, and/or the third power supply voltage to the off-state or the low voltage.

9. The control method of a display device of claim 8 further comprising:
- executing, when a sensor circuit configured to receive an output of the detection electrode operates by an external voltage from an external power supply circuit, and the display device is in a sleep state, self-sensing by driving the detection electrode; and
- making, while the self-sensing is being executed, a switch configured to supply the first power supply voltage to the image processor, the second power supply voltage to the panel controller, the fourth power supply voltage to the sensor driver, and a fifth power supply voltage to the internal power supply circuit in an off-state.

10. The control method of a display device of claim 8, further comprising:
- causing a sensor circuit to execute self-sensing by driving the detection electrode, when the sensor circuit configured to receive an output of the detection electrode and a host device configured to prepare a command used for control the display device and image data supplied to the image processor, and when the sensor circuit and the hose device operate by an external power voltage from an external power supply circuit, and the display device is in a sleep state, and
- causing, while the sensor circuit is executing the self-sensing, the host device to make a switch configured to supply the first power supply voltage to the image processor, the second power supply voltage to the panel controller, and a fifth power supply voltage to the internal power supply circuit in an off-state, respectively.

11. The control method of a display device of claim 8, further comprising:
- causing a sensor circuit to execute self-sensing by driving the detection electrode, when the sensor circuit is driven by an external voltage from an external power supply circuit and receives the detection signal from the detection electrode, and the display device is in a sleep state,
- causing part or the whole of the internal power supply circuit to receive the external voltage from the external power supply circuit to operate, and
- causing a timing controller to receive a power supply voltage from the internal power supply circuit to operate, and
- causing, while the sensor circuit is executing the self-sensing, the timing controller to control a part or all of the image processor, the panel controller, and the sensor driver to be in an off-state of the power supply voltage or to be in a low voltage operation state, respectively.

12. The control method of a display device of claim 8, further comprising:
- causing a part or the whole of the internal power supply circuit to operate by an external voltage from an external power supply circuit,
- a gamma voltage generation circuit configured to generate a gamma voltage to be used in the image processor, a sensor circuit configured to receive the detection signal of the detection electrode, a timing controller configured to generate a timing signal, and the sensor driver configured to drive a common electrode of the input sensor to operate by the corresponding power supply voltages from the internal power supply circuit, and causing, on the basis of control of the timing controller, the sensor driver to operate by the corresponding power supply voltages from the internal power supply circuit, to execute mutual sensing by utilizing the common electrode and the drive electrode of the input sensor, and to control, in the period of the mutual sensing, the image processor, the panel controller, and the gamma voltage generation circuit to be in an operating state of a low voltage and/or a low frequency.

13. The control method of a display device of claim 8, further comprising:

causing a gamma voltage generation circuit configured to generate a gamma voltage used in the image processor, a sensor circuit configured to receive the detection signal of the detection electrode, a timing controller configured to generate a timing signal, and the sensor driver configured to drive a common electrode of the input sensor to operate by the corresponding power supply voltages from the internal power supply circuit, and causing the timing controller to set the first period and the second period in one frame period, making the first period a sensing period in which the sensor driver is driven to detect operation input, making the second period a write period in which the image signal is written to the display element matrix, and controlling, in the second period, the first power supply voltage and the second power supply voltage to a normal voltage, and/or the third power supply voltage to the normal voltage, the normal voltage having a wider range that the low voltage in the first period.

* * * * *